US009119063B2

(12) United States Patent
Beckley et al.

(10) Patent No.: US 9,119,063 B2
(45) Date of Patent: Aug. 25, 2015

(54) UNAUTHORIZED LOCATION DETECTION AND COUNTERMEASURES

(71) Applicant: TruePosition, Inc., Berwyn, PA (US)

(72) Inventors: Frederic A. Beckley, Philadelphia, PA (US); Robert J. Anderson, Phoenixville, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 14/070,899

(22) Filed: Nov. 4, 2013

(65) Prior Publication Data

US 2014/0059655 A1    Feb. 27, 2014

Related U.S. Application Data

(63) Continuation of application No. 12/976,908, filed on Dec. 22, 2010, now Pat. No. 8,627,484.

(51) Int. Cl.
*H04W 12/02* (2009.01)
*H04W 4/00* (2009.01)
*H04W 4/02* (2009.01)
*H04W 12/12* (2009.01)
*H04W 12/08* (2009.01)

(52) U.S. Cl.
CPC .............. *H04W 12/02* (2013.01); *H04W 4/001* (2013.01); *H04W 4/02* (2013.01); *H04W 12/08* (2013.01); *H04W 12/12* (2013.01)

(58) Field of Classification Search
CPC ..... H04W 12/08; H04W 12/12; H04W 12/02; H04W 4/02

USPC ....................................................... 726/22, 26
See application file for complete search history.

(56) References Cited

U.S. PATENT DOCUMENTS

| 6,311,059 | B1* | 10/2001 | Walton .......................... 455/425 |
| 6,505,048 | B1* | 1/2003 | Moles et al. ............... 455/456.1 |
| 6,506,048 | B1* | 1/2003 | Staffin et al. ...................... 432/9 |
| 6,633,621 | B1* | 10/2003 | Bishop et al. ................. 375/376 |
| 7,006,835 | B2* | 2/2006 | Otsuka et al. .............. 455/456.1 |
| 7,751,826 | B2* | 7/2010 | Gardner et al. ............ 455/456.1 |
| 7,800,533 | B2 | 9/2010 | Harper et al. |

(Continued)

OTHER PUBLICATIONS

"Thousands of iPhone Apps Tracking Users Location Without Permission", cellular-news, Jul. 18, 2012, http://www.cellular-news.com/story/printer/55445.php?ModPagespeed=off, 2 pages.

(Continued)

*Primary Examiner* — Jung Kim
*Assistant Examiner* — Thomas Ho
(74) *Attorney, Agent, or Firm* — Baker & Hostetler LLP

(57) ABSTRACT

A location sentry system is provided for use within a mobile device. The sentry system can be configured to detect unauthorized attempts to locate mobile devices by monitoring messages passed between the mobile device and the wireless network and/or messages passed between components of the mobile device, and determining that one or more of the messages is/are indicative of an attempt to locate the mobile device. In response to a determination that an unauthorized attempt has been detected, the location sentry can be configured to take one or more actions. For example, the location sentry system could prevent location information from being sent back to the wireless network and/or the location sentry system could cause incorrect information to be sent to the wireless network.

29 Claims, 8 Drawing Sheets

(56) References Cited

U.S. PATENT DOCUMENTS

| | | | | |
|---|---|---|---|---|
| 8,060,074 | B2* | 11/2011 | Danford et al. | 455/419 |
| 2002/0138650 | A1* | 9/2002 | Yamamoto et al. | 709/245 |
| 2002/0173317 | A1* | 11/2002 | Nykanen et al. | 455/456 |
| 2003/0001774 | A1* | 1/2003 | Harris | 342/357.1 |
| 2005/0136891 | A1 | 6/2005 | Wang et al. | |
| 2006/0040677 | A1* | 2/2006 | Dietrich et al. | 455/456.2 |
| 2006/0099970 | A1* | 5/2006 | Morgan et al. | 455/456.6 |
| 2006/0258352 | A1* | 11/2006 | Ishii | 455/435.1 |
| 2008/0242373 | A1* | 10/2008 | Lu et al. | 455/575.1 |
| 2009/0036111 | A1 | 2/2009 | Danford et al. | |
| 2009/0325615 | A1 | 12/2009 | McKay et al. | |
| 2010/0077484 | A1* | 3/2010 | Paretti et al. | 726/26 |
| 2010/0231383 | A1 | 9/2010 | Levine et al. | |
| 2010/0328064 | A1* | 12/2010 | Rogel | 340/540 |
| 2011/0214184 | A1* | 9/2011 | Whitehouse et al. | 726/24 |
| 2013/0064202 | A1* | 3/2013 | Zhang et al. | 370/329 |

OTHER PUBLICATIONS

3$^{rd}$ Generation Partnership Group (3GPP), TS 25.305, V9.0.0, 3$^{rd}$ Generation Partnership Project; Technical Specification Group Radio Access Network; "Stage 2 functional specification of User Equipment (UE) positioning in UNTRAN", Dec. 2009, 79 pages.

3$^{rd}$ Generation Partnership Group (3GPP), TS 36.305, V9.8.0, 3$^{rd}$ Generation Partnership Project; Technical Specification Group Radio Access Network (E-UTRAN); "Stage 2 functional specification of User Equipment (UE) positioning in E-UTRAN", Release 9, Sep. 2011, 51 pages.

3rd Generation Partnership Group (3GPP), TS 43.059, V9.0.0, 3$^{rd}$ Generation Partnership Project; Technical Specifications Group GSM/EDGE, Radio Access Network; "Functional stage 2 description of Location Services (LCS) in GERAN", Nov. 2009, 69 pages.

3$^{rd}$ Generation Partnership Project 2 (3GPP2), C.S0022-0, V3.0, 3$^{rd}$ Generation Partnership Project 2, "Position Determination Service Standards for Dual Mode Spread Spectrum Systems" Feb. 16, 2011, 146 pages.

3$^{rd}$ Generation Partnership Project 2 (3GPP2), C.S0022-A, V1.0 ,3$^{rd}$ Generation Partnership Project 2, "Position Determination Service for cdma2000 Spread Spectrum Systems", Mar. 2004, 298 pages.

Enck, W. et al., "TaintDroid: An Information-Flow Tracking System for Realtime Privacy Monitoring on Smartphones," presented at the 9th USENIX Symposium on Operating Systems Design and Implementation 2010 ("OSDI 10") held in Vancouver BC Canada, Oct. 4-5, 2010, 15 pages.

Lederman, "Surveillance requests to cellphone carriers surge", myfoxny.com, Jul. 9, 2012, http://www.myfoxny.com/story/18984877/surveillance-requests-to-cellp . . . , 3 pages.

Lichtblau, "More Demands on Cell Carriers in Surveillance", The New York Times, Jul. 8, 2012, http://www.nytimes.com/2012/07/09/us/cell-carriers-see-uptick-in-reques . . . , 4 pages.

Markey, "Letter to Randall Stephenson regarding New York Times article", Congress of the United States, House of Representatives, May 2, 2012, 3 pages.

McAllister, "US law enforcement phone snooping on the rise—John Law made 1.3 million rat-on requests in 2011", The Register, Jul. 9, 2012, http://www.theregister.co.uk/2012/07/09/markey_wireless_snooping/, 3 pages.

McKone, "Response to letter to Randall Stephenson dated May 2, 2012", AT&T Services, Inc., May 29, 2012, 8 pages.

\* cited by examiner

UNAUTHORIZED LOCATION DETECTION AND COUNTERMEASURES

CROSS REFERENCE TO RELATED APPLICATIONS

This application is a continuation of U.S. application Ser. No. 12/976,908, filed Dec. 22, 2010, the contents of which are incorporated herein by reference in their entirety.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to a method for detecting and preventing unauthorized location of a mobile device.

BACKGROUND

The location of a mobile wireless device utilizes one or more positioning techniques in order to estimate the location and in some cases, the speed, direction-of-travel, and altitude of the mobile device (also known as the mobile, mobile station (MS), handset, or user equipment (UE).

Determining the position of a mobile device involves two main steps: collection of radio signal measurements, and a local or remote position estimate computation based on those measurements. Signal collection can be performed by a receiver within or co-located with the mobile device.

Hybrid positioning, using multiple methods positioning methods, is used to increase the accuracy or yield of a location estimate.

Location Technique Standardization

The location techniques used in different wireless communications networks (WCN) using different radio transmission technologies are subject to standardization. Notable standards development organizations include the $3^{rd}$ Generation Partnership Program (3GPP), the $3^{rd}$ Generation Partnership Program 2(3GPP2), and the Open Mobile Alliance (OMA.)

Location techniques standardized for the Global System for Mobility (GSM) are detailed in 3GPP Technical Specification TS 43.059, "Functional stage 2 description of Location Services (LCS) in GERAN". The GSM location techniques include: cell coverage based positioning, Enhanced Observed Time Difference (E-OTD) positioning, Assisted Global Navigation Satellite System (A-GNSS) based positioning; and Uplink Time Difference of Arrival (U-TDOA) positioning.

Location techniques standardized for the Wide-band CDMA system (better known as Universal Mobile Telecommunications System (UMTS)) are detailed in 3GPP Technical Specification 25.305, *"Stage 2 functional specification of User Equipment (UE) positioning in UTRAN."* The UMTS location techniques include: cell coverage based positioning, Observed Time Difference Of Arrival (OTDOA) positioning, A-GNSS based positioning, and U-TDOA.

Location techniques standardized for the Evolved Universal Mobile Telecommunications System (more commonly known as the Long-Term Evolution or LTE system) are described in 3GPP Technical Specification 36.305, "Stage 2 functional specification of User Equipment (UE) positioning in E-UTRAN." The current (release 9) LTE location techniques include: uplink and downlink cell coverage based positioning, Observed Time Difference Of Arrival (OTDOA) positioning, and A-GNSS based positioning. While not yet standardized, the U-TDOA positioning technique is applicable to LTE.

Location techniques standardized for the IS-95 (CDMA-One) and IS-2000 (CDMA-2000) radio access networks are described in 3GPP2 Specifications C.S0022-0, "Position Determination Service Standards for Dual Mode Spread Spectrum Systems," and C.S0022-A "Position Determination Service for CDMA2000 Spread Spectrum Systems." The 3GPP2 standardized techniques include cell-based positioning, Advanced Forward Link Trilateration (AFLT) and Assisted Global Positioning Satellite positioning.

Mobile-Based and Mobile-Assisted Location Techniques

Mobile location techniques use radio signals collected at the mobile device to generate a location estimate. Mobile Location techniques for wireless communication devices can be broadly categorized as mobile-based or mobile-assisted dependent on the use of precursor information and where the final location estimate is calculated. Mobile location techniques can be combined with each other and with network-based location techniques (Uplink time-difference-of-arrival (U-TDOA) and/or angle of arrival (AoA)) to achieve the highest yields and accuracies.

The least accurate, but highest availability mobile location method is called cell-ID Positioning. The cell-ID, cell coverage based positioning or cell-ID positioning technique uses radio broadcast information from the cellular network already in use to allow mobility. Translation of the cell-ID (or cell/sector ID) into a latitude and longitude may be performed at the mobile or at a networked, landside server. The basic cell-ID location can be improved with the addition of time or power-based ranging.

Enhanced Cell-ID (ECID) positioning uses cell-ID positioning with the addition of timing and power measurements made by the mobile of the downlink broadcast beacon from the serving and neighboring cell sites. ECID is considered a mobile-based location technique as the signal collection and measurement is performed at the mobile but location calculation is generally preformed at a network server. Although not explicitly standardized this technique has been commercially deployed.

Enhanced Observed Time Difference (E-OTD) positioning is a mobile-based technique for unsynchronized wireless networks. The EOTD system uses the time-of-arrival of a cell broadcast radio signals at the mobile device receiver. Collected signal timing and cell-ID information is then transmitted to a networked, landside server. The EOTD system must supply the geographic location and the collected timing offsets for each cell transmitter in order to determine a location estimate.

A variation of ECID is Radio Fingerprinting. Radio Fingerprinting may be implemented as a mobile-based technique uses downlink (network-to-mobile) radio signal collected by the mobile. Radio Fingerprinting is also called Wireless Signatures, Multipath Fingerprinting, Database Correlation Method (DCM), or Pilot Correlation. The radio fingerprinting technique uses the propagation characteristics of a reflected and refracted radio signal as received by the mobile device to determine a location by matching with a signal from a database of recorded or modeled signal propagation characteristics (also called radio fingerprints). Although not explicitly standardized this technique has been commercially deployed.

Observed Time Difference Of Arrival (OTDOA) is a mobile-based technique that uses the relative timing offset of the broadcast beacons from different cells. A time difference of arrival technique, OTDOA requires a minimum of three cell beacons to determine a location. The purely downlink-TDOA based location estimation will typically be combined with a cell-ID-with-ranging location estimate and databased information on the geographic location of the reported cell beacon transmitter antenna to create a final hybrid location estimate.

Advanced (or Enhanced) Forward Link Trilateration (AFLT or EFLT) is a mobile-based technology used only in WCN with precise timing and base station synchronization. Mobile-based AFLT requires reception of beacons from four or more cells and knowledge (normally via cell broadcast) of the geographic locations of those cells. Network-assisted AFLT requires reception of three or more cell beacons by the mobile device and a communications channel to a landside server which uses the mobile device-collected signal measurements and geographic locations of the cells to calculate a location estimate.

Assisted Global Navigation Satellite System (A-GNSS) and Assisted Global Positioning Satellite positioning is technically a mobile-based technique since the satellite broadcast signals used for location are collected at the mobile device via a specialized receiver and antenna. Network-generated assistance information is transmitted to the receiver to increase receiver sensitivity and decrease the time-to-first-fix. A-GNSS may be deployed as network-assisted, mobile-based where the signals are collected and final location is produced local to the mobile device, or as network-assisted, network-computed, where the collected signal information is transmitted to a landside server for final location estimation.

The inventive techniques and concepts described herein apply to time and frequency division multiplexed (TDMA/FDMA) radio communications systems including the widely used IS-136 (TDMA), GSM, and OFDM-based wireless systems, such as the IEEE 802.16e "WIMAN" and 802.20 "WIMAX" system and the 3GPP Long Term Evolution (LTE and LTE Advanced) system, as well as code-division radio communications systems such as CDMA (IS-95, IS-2000) and Universal Mobile Telecommunications System (UTMS), the latter of which is also known as W-CDMA. The Global System for Mobile Communications (GSM) model used herein as examples is an exemplary but not exclusive environment in which the present invention may be used.

SUMMARY

With the advent of wide area wireless location systems for mobile telecommunications, the need to detect and foil unwanted, unauthorized location attempts become paramount to ensure privacy and security of users in a wireless world. By detecting location related events and messaging at the mobile device, the user is alerted to location disclosure.

As explained in more detail in the following paragraphs, a location sentry system for use in a mobile device can be used to detect unauthorized attempts to locate a mobile device. Generally, the location sentry system can be configured to detect unauthorized location attempts by gathering information indicative of changes to the internal state of a mobile device along with sent/received messages and storing the information as event records in a log. The sentry system can be configured to analyze the log of events and determine that an event, or a sequence of events, is indicative of an attempt to locate the mobile device.

Once an unauthorized attempt has been detected, the location sentry system can be configured to log the attempt and/or alert a user. In the same, or another embodiment, the location sentry system may also be configured to prevent the location attempt and/or provide incorrect information to the wireless network. In addition to the foregoing, other techniques are described in the claims, the detailed description, and the figures.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF ILLUSTRATIVE EMBODIMENTS

We will now describe illustrative embodiments of the present invention. First, we provide a detailed overview of the problem and then a more detailed description of our solutions.

Wide area wireless location system have been deployed to support emergency services and telematics. With growing public awareness of location-based services came the fears that unauthorized locations were being made without the users express consent and being used by commercial entities such as marketers and advertisers.

As wireless data services proliferate, with wireless data-capable devices already exceeding the personal computer in number and accesses to the internet. As location is a legal requirement for mobile devices, it is expected that unauthorized location will also proliferate.

Unauthorized location is detected at the mobile device. Detection of a location is by means of analysis of messaging, events and patterns of events that indicate an unauthorized location attempt has been initiated (or is in progress, or has just completed). These events range from standardized location request messaging to patterns of messaging dependent on the location technology, data and control linkage, and radio access technology.

Trending is the recording of time-stamped event data that could be part of a location attempt. Trend data becomes the historical data that can lead to recognition of a location event. Heuristic algorithms can be employed to assist in the recognition of unusual messaging, events and timings.

FIG. 1

Figure 1:
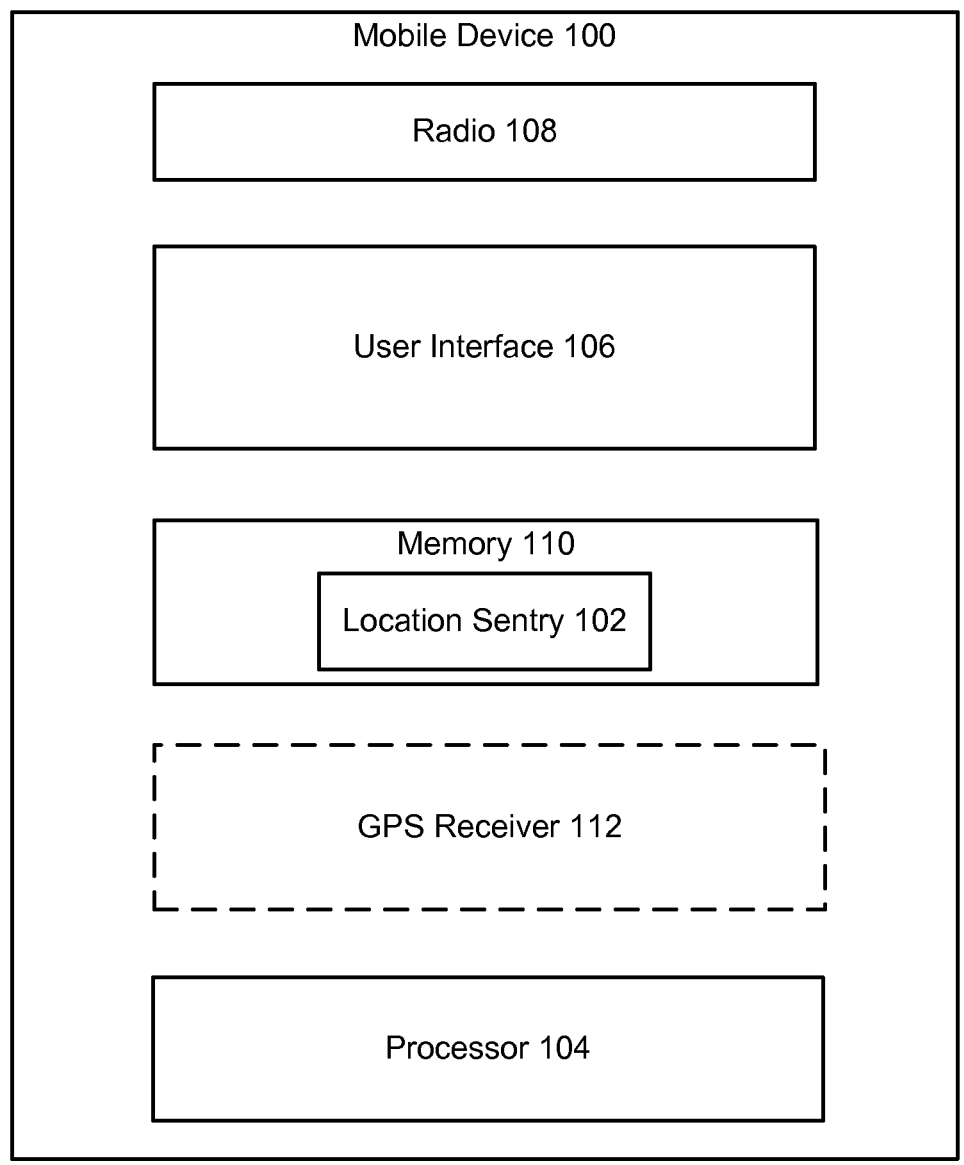
FIG. 1 illustrates a high-level block diagram of a mobile device that can include the location sentry system.

Referring now to FIG. 1, it illustrates a mobile device 100 in which the invention can be implemented. Generally, mobile device 100 can be a cellular phone, a personal digital assistant (PDA), a pager with a graphics display, a smartphone, or any other type of mobile communications unit. As shown, mobile device 100 can include a memory 110, which can be random access memory (RAM), read-only memory (ROM), electronically programmable read-only ROM (EPROM), etc. In at least one exemplary embodiment, location sentry 102 can be one or more modules of executable instructions that can be stored in memory 110. A processor, e.g., processor 104, can be operatively coupled to memory 102 via a communication bus. When powered, processor 104 can read information from memory 110 and execute instructions. Processor 104 can be any type of processor suitable to operate in a mobile environment. For example, an exemplary processor could be based on the Advanced RISC Machine (ARM) v7 instruction set and optimized for use in smartphone environments.

Continuing with the general description of FIG. 1, mobile device 100 can also include user interface 106, which could be a touch display or a display/keyboard combination. User interface 106 can be configured to render one or more notifications in the instance that sentry 102 detects an unauthorized attempt to locate mobile device 100. Mobile device 100 can include a global positioning system (GPS) receiver 112 (illustrated in dashed lines to indicate that it is considered optional) coupled to a specialized antenna. In an exemplary embodiment of the invention where mobile device 100 includes GPS receiver 112, mobile device 100 can be configured to use it to sample satellite signals. GPS 112 can then use the signals to calculate its position or send the signals to the wireless network for processing. FIG. 1 also depicts radio 108. Radio 108 can include all the hardware and firmware necessary to send and receive radio signals to a wireless network base station, etc. For example, radio 108 can include the physical transceiver, antenna, chipset, and any firmware to enable mobile device 100 to communicate with a wireless network.

FIG. 2

Figure 2:
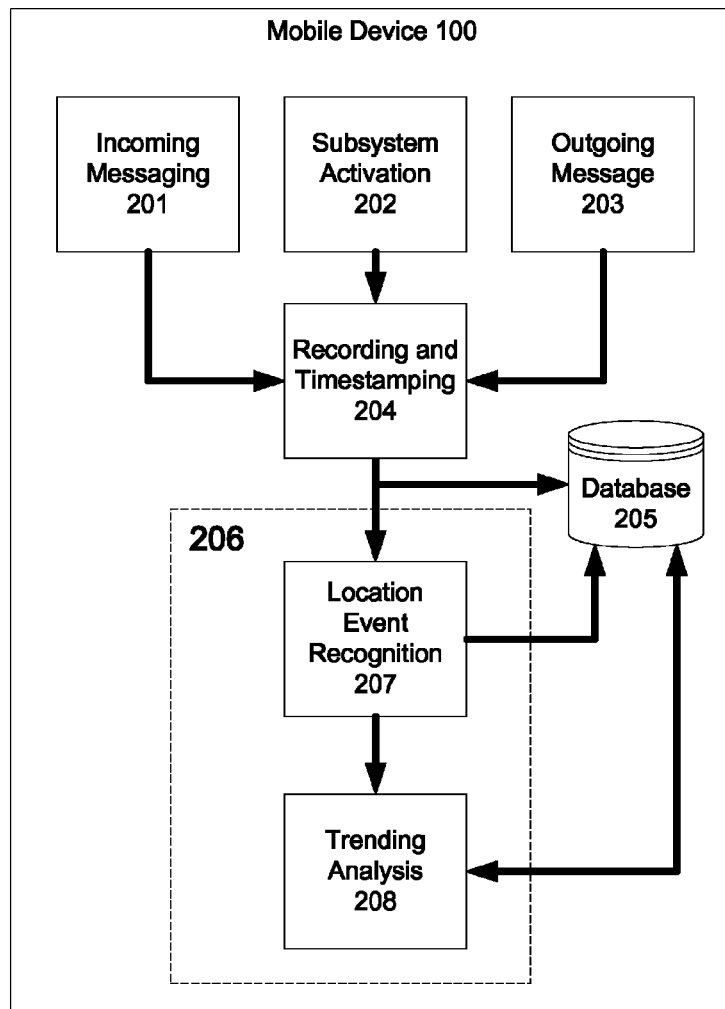
FIG. 2 shows a high-level depiction of the location sentry implemented as a privileged client application

Referring now to FIG. 2, it depicts the detection procedure for the location sentry. Each incoming message is monitored 201. Each internal subsystem activation on the mobile device is monitored 202 and each outgoing message is monitored 203. A record, including a timestamp is made for each monitored event 204. The record is stored in a relational database 205 on the wireless device 100 for future use. The database 205 also stores location authorizations, both Ad Hoc and persistent.

Detection 206 of unauthorized attempts to locate the mobile device 100 is a two stage process. Each monitored event is examined for a location recognition event 207. The location recognition analysis looks at the message type and message contents to detect a location event.

The trending analysis 208 uses historical information or modeled information from the database 205 to assess the probability of an unauthorized location event. Trending analysis detects on the basis of repeated actions and deviations from past message sequences and activations. In a specific example, location sentry can include a module of executable instructions that looks at each message and calculates the probability that the event is an unauthorized attempt to locate the mobile device 100 by comparing the message to information stored in database 205.

For example, database 205 can include a data structure that lists the process identifiers for processes that are authorized to access a location subsystem and/or the conditions under which a process can access the location subsystem. Database 205 can also include a list of processes that are authorized to send location information and/or the conditions under which a process can send location information. Suppose mobile device 100 includes a map program, in a specific example the map program may be authorized to access location subsystem and send location information to the network when user input is received directing it to do so; otherwise, the map program may not be authorized to access the location subsystem and/or send location information.

Design of a Mobile-Based Application

The location sentry can be a mobile-based application, the general design of mirrors that of an internet firewall and malicious software (anti-virus) scanning software but designed to detect location related events. Depending on the preferences of the implementer, three options for the design of the location sentry are foreseen.

Client Application Option

If implemented as a client software, the location sentry insinuates itself into the various hardware drivers, protocol stacks and application programming interfaces (API's) implementations as to have access all incoming and outgoing messages, subsystem activations and intra-system messaging between other applications.

FIG. 3

Figure 3:
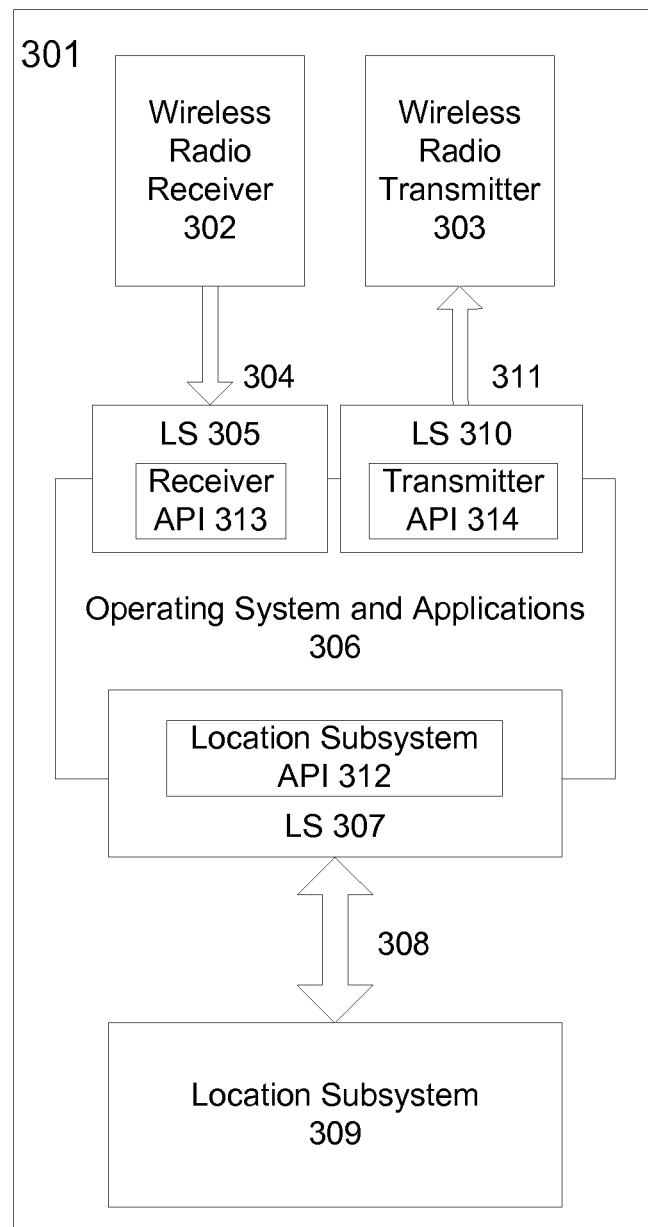
FIG. 3 shows a high-level depiction of the location sentry implemented within a hardware virtualization environment.

FIG. 3 shows a high-level depiction of such a client application. The mobile device 301 has a wireless radio receiver subsystem 302 that can receive demodulated messages from a receiver such as radio 108 of FIG. 1 and pass them to the operating system 306 via a virtual or physical data interconnection 304. The LS (location sentry) client application 305 encapsulates the operating system's receiver API 313 and monitors the incoming message stream for location-related traffic. For example, the LS client application 305 can implement the interfaces used by receiver API 313 to interface with wireless radio receiver 302 and receive demodulated messages; analyze them; and then pass them to receiver API 313.

Location hardware (such as a GPS chipset) or location software (routines for signal collection for location) are shown in FIG. 3 as the location subsystem 309, communicating with the operating system 306 via a virtual or physical data interconnection 308. The location sentry application 307 encapsulates the operating system's application program interface for the location subsystem 312. Similar to LS client 305, LS client 307 can be configured to implement the interfaces used by location subsystem API 312 so that it can receive messages; analyze them; and pass them between operating system 306 and location subsystem 309.

A location sentry 310 gateway and API for outgoing messaging allows for analysis of messaging before being delivered to the wireless radio transmitter 303 via a virtual or physical data interconnection 311. The LS client application 310 encapsulates the operating system's transmitter gateway API 314 and monitors the outgoing message stream for location-related traffic. Any detected outbound location-related messages can then be filtered, edited, or substituted before transmission.

Hardware Virtualization Option

The location sentry may be implemented as part of a hardware virtualization (HV) package. The HV package transparently encapsulates the mobile device's operating system allowing full functionality while granting the location sentry full access to all incoming and outgoing messages, subsystem activations state changes, and intra-system messaging.

FIG. 4

Figure 4:
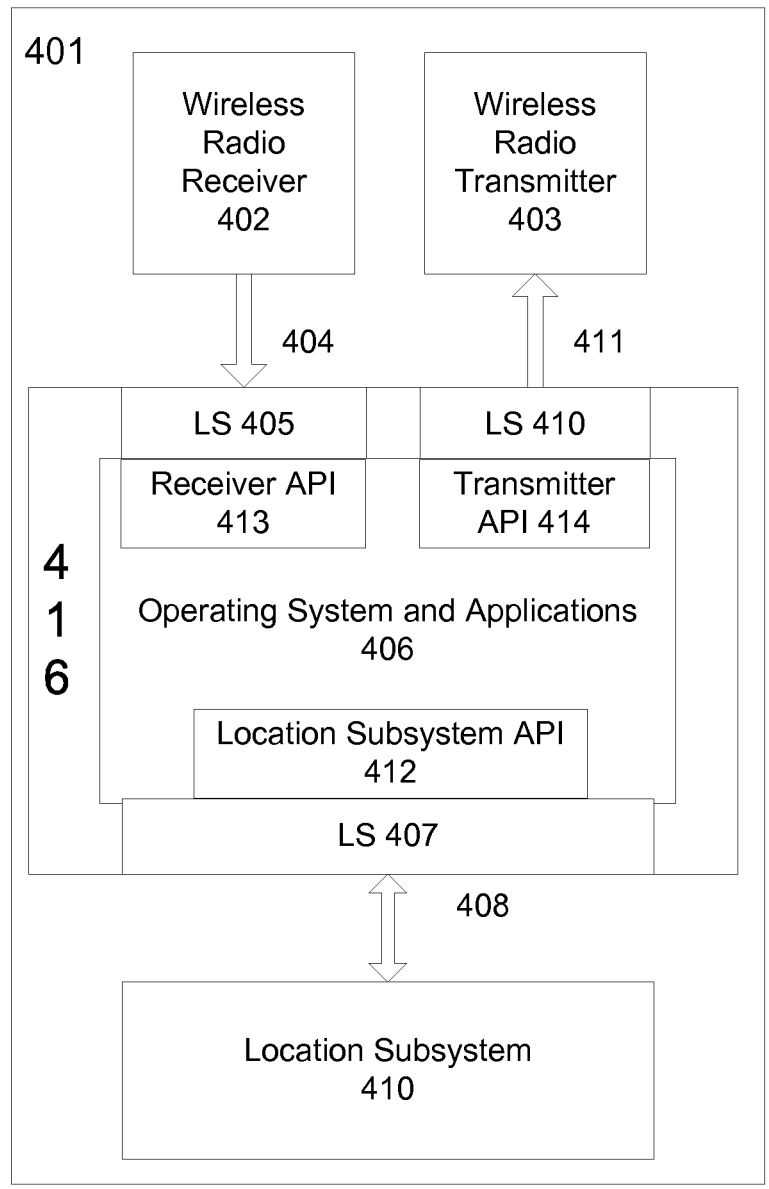
FIG. 4 shows a high-level depiction of the location sentry implemented as part of the mobile device operating system

Referring to FIG. 4, it shows a high level example depiction of the location sentry implementation as part of a hardware virtualization package 416. The mobile device 401 has a wireless radio receiver subsystem 402 that passes demodulated messages to the hardware virtualization environment (HVE) 416 via a virtual or physical data interconnection 404. The mobile device operating system 406 operates within the hardware virtualization environment 412, which itself is an operating system with a complement of hardware interfaces and driver applications. The LS client application 405 here acts as a bridge between the HVE 412 and the wireless receiver API 413, analyzing and filtering location related radio messaging.

Location hardware (such as a GPS chipset) or location software (routines for signal collection for location) are shown in FIG. 4 as the location subsystem 409, communicating with the operating system 406 via a virtual or physical data interconnection 408 which passes thru the location subsystem API 412 and the Location Sentry 407 allowing for deactivation, filtering and substitution of location or location-related measurements.

A location sentry 410 gateway and API for outgoing messaging allows analysis of messaging before being delivered to the wireless radio transmitter 403 via a virtual or physical data interconnection 411. As part of the hardware virtualization environment 416, the location sentry 410 can filter, edit, or substitute location-related messaging generated within the location subsystem 409 or OS 406 before transmission.

In this exemplary embodiment, the virtualization environment 416 can emulate the interfaces for the wireless radio receiver subsystem 402, the wireless radio transmitter subsystem 403, and/or the location subsystem 409. In this example, the operating system 406 would not have to be modified nor would application program interfaces be encapsulated. Rather, the hardware virtualization environment 416 could be configured to trap attempts by the various APIs to access hardware resources and/or subsystems and analyze any messages they attempt to pass. In addition, the HVE 416 can be configured to analyze received messages prior to reporting them to the receiver application program interface 413.

Custom Designed Secure Mobile Option

The location sentry can be implemented as part of customized secure mobile device. Effectively acting as part of the customized operating system and hardware level firmware, the location sentry gains full access to all incoming and outgoing messages, state changes, subsystem activations and intra-system messaging.

FIG. 5

Figure 5:
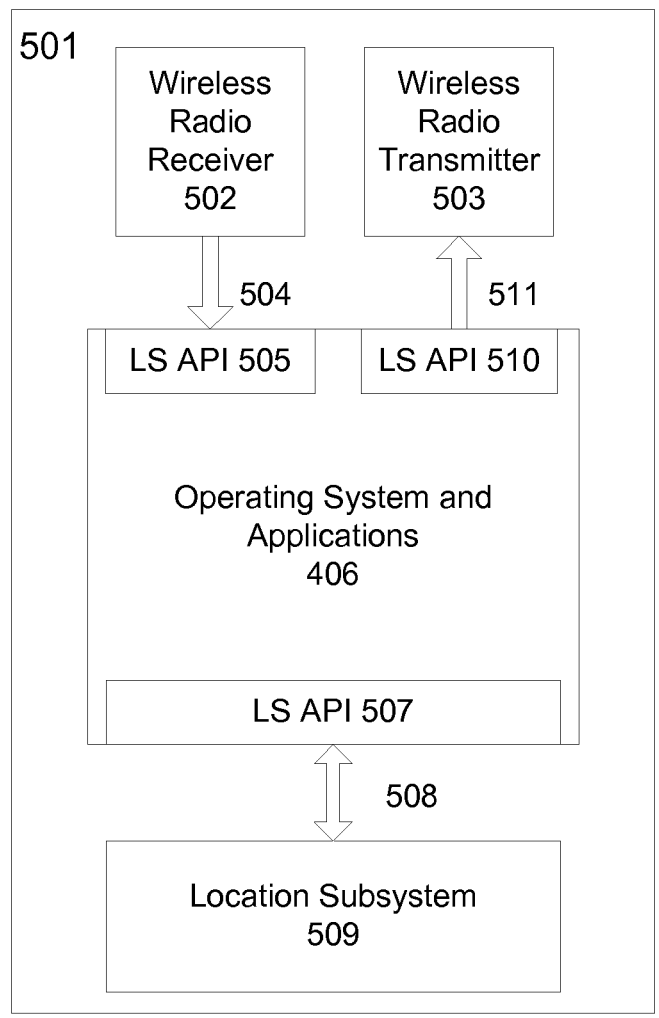
FIG. 5 depicts the generalized procedure for discovery of an unauthorized location attempt.

FIG. 5 depicts an example of the location sentry implemented as part of the mobile device's operating system 506. This implementation could be achieved by the writing of a custom operating system or patching of the core system structures within the operating system, allowing the location sentry specific drivers to replace existing drivers and daemons in the modified operating system.

The mobile device 501 has a wireless radio receiver subsystem 502 that passes demodulated messages to the hardware operating system 506 via a virtual or physical data interconnection 504. The LS application 505 is the gateway and API for the incoming messaging to the operating system 506 and analyzes and falterers location related radio messaging before routing to the correct application. In this example, LS application 505 could be a modified version of the wireless radio receiver application program interface.

Location hardware (such as a GPS chipset) or location software (routines for signal collection for location) are shown in FIG. 5 as the location subsystem 509, communicating with the operating system 506 via a virtual or physical data interconnection 508. The location sentry 507 is the gateway and API for the for exchange of messages between the operating system 506, an application, and the location subsystem 509 allowing for deactivation, filtering and substitution of location or location-related measurements.

A location sentry 510 gateway and API for outgoing messaging allows analysis of messaging before being delivered to the wireless radio transmitter 503 via a virtual or physical data interconnection 511. As part of the operating system 506 drivers, daemons, and APIs, the location sentry 510 can filter, edit, or substitute location-related messaging before transmission.

Location Request and Response Types

A location attempt can be immediate, with a timely response expected. A location attempt can be immediate with delayed delivery. A location attempt can be delayed with the response sent after a set delay or triggering event. A location attempt can be store and burst, with multiple location estimations stored with the collected responses transmitted after a set delay or triggering event.

Mobile States and States Transitions

A mobile device has two general states, active and idle. While in the idle state, the mobile conserves power by limiting on-board activity and keeping transmission facilities powered down. While in idle mode, the mobile device typically periodically activates receiver facilities to check the local beacon(s) for relevant messages. When in active mode, the mobile device uses control or traffic channel resources (or in a packet radio network, control plane and user plane resources) to transfer data between the mobile device and the wireless communications network.

The terms control channel, traffic channel, control plane and user plane are indicative of the design of the wireless network.

In a WCN designed for switched-circuit, predominately voice traffic, transmissions; control channels are used for messaging between the wireless network that controls mobile device states, radio settings, and network access. Limited bandwidth, limited duration data sessions (predominately Short-Message-Service (SMS) may also be supported on the control channel. A traffic channel is a radio network equivalent of a switched circuit and is designed to support high bandwidth, high duration voice and data sessions.

In a WCN designed for packet-data transmissions, control data is deemed the control plane while data traffic (including packetized voice) is deemed user plane. The control plane, defined as the messaging between the wireless network that controls mobile device states, radio settings, and network access parameters. The user plane, defined as the messaging between peer entities, allows for data transmissions between software applications local to the mobile device and land-based (or mobile-based) server-based applications. Generally, the wireless communications network (WCN) is unaware of the contents of the user plane. User plane transmitted message contents may be encrypted to prevent snooping. User plane conveyed data can be used by privileged mobile-resident applications to access the mobile's location subsystems.

Generic Detection of Mobile-Based Location Attempts

Mobile-based (and mobile-assisted) location techniques require the collection of radio information at the mobile-device. This radio information may be the reception of satellite signaling for GNSS positioning or the radio information may be collected from cell broadcasts (forward-link) for the EOTD, OTDOA, or AFLT positioning techniques.

Mobile-Based Active Mobile Location

An active mobile is engaged in an information transfer using the wireless communication network radio resources. To locate active mobile using a mobile-based location technique, the mobile must receive location-related messaging (activation and potentially assistance data), the mobile will collect location information, e.g., GPS coordinates, beacon measurements from surrounding base stations, satellite measurements etc., the mobile will activate location-related hardware (if applicable) and then the mobile must transmit the location or location-related signal data. All of these mobile actions can be detected and any can act as a trigger for analysis for recognition of a location event in progress.

FIG. 6

Figure 6:
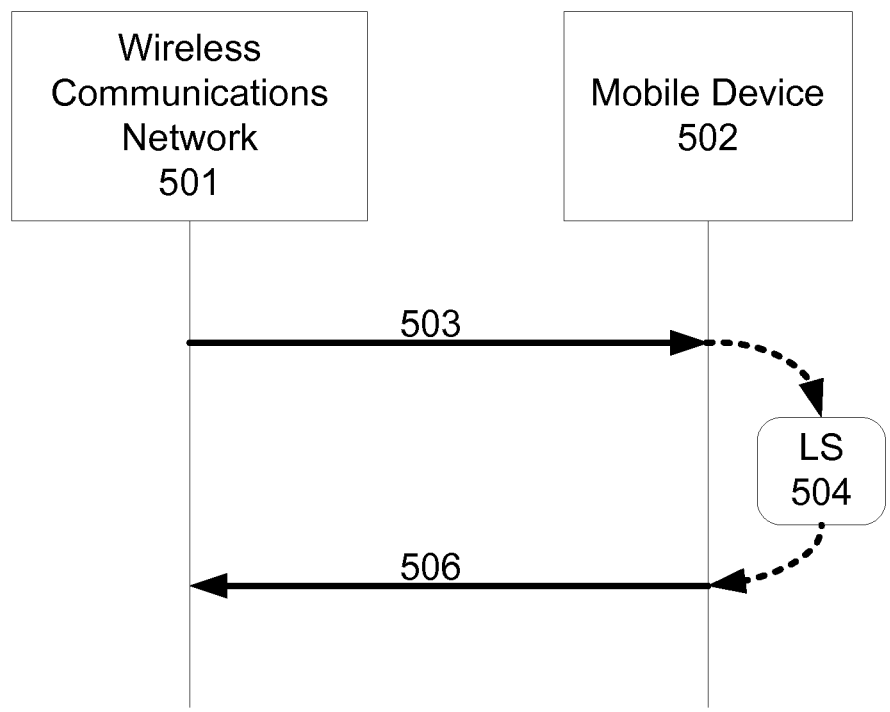
FIG. 6 depicts the generalized procedure for discovery of an unauthorized location attempt.

FIG. 6 shows a simplified illustration of a location recognition event. In this example, the Wireless Communications Network 601 sends a message (or messaging) 603 to the mobile device 602.

The Location Sentry 604 examines the incoming message(s) 603. If an unauthorized location event is detected, e.g., an event indicative of receipt of a location request and/or data used to assist in a location calculation, the Location Sentry 604 can respond 606 with an error message, a default location, or a spoofed location.

Mobile-Based Idle Mobile Location

An idle mobile acts as a receiver, listening to the broadcast channel(s) for messages specific to its on-air identity. To locate an idle mobile using mobile-based techniques, the mobile first must be brought active and then location-related messaging used to activate the mobile-based software (and potentially hardware) before a location or location data can be developed. The change in state followed by the location-related messaging is an indicator of a location attempt.

FIG. 7

Figure 7:
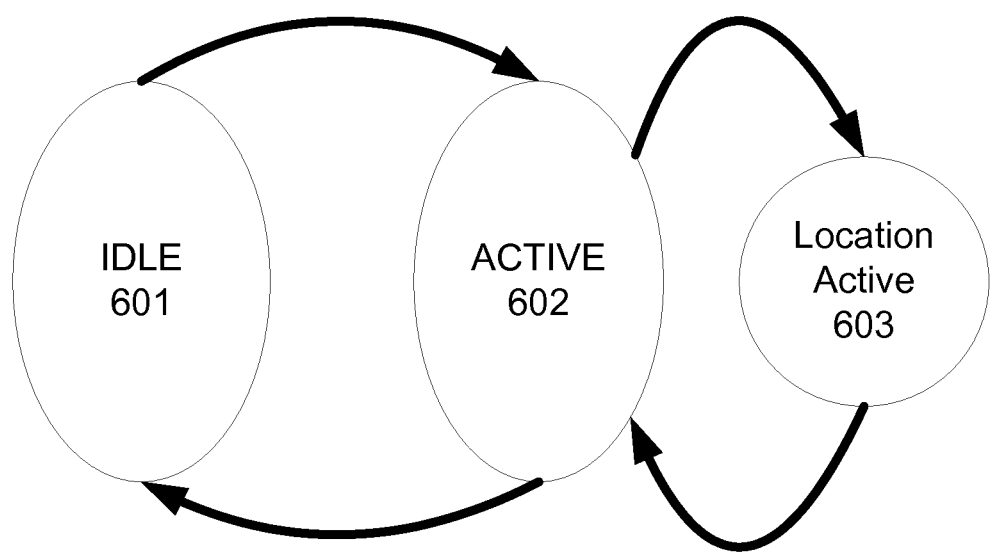
FIG. 7 depicts the generalized procedure for discovery of an unauthorized location attempt.

FIG. 7 illustrates the example of location detection via device state changes and subsystem activations.

The mobile achieves IDLE state 701 sometime after successfully accessing the radio access network. Due to incoming radio messaging or internal application-level messaging, the mobile is moved to the ACTIVE 701 state. The location sentry detects an unauthorized activation of the onboard location subsystem 703, causing an alert to be generated and optionally displayed on a display of the mobile device. Similar to that described above, the onboard location subsystem 703 can include both the circuitry-based systems (e.g. GNSS) and also the software API based (e.g. AFLT, OTDOA). For example, an unauthorized activation could be detected by comparing a process identifier of a process that attempts to access the location subsystem 703 to a list stored in a database. In the instance that the process identifier is not in the list, the location sentry can be configured to determine that this is an unauthorized attempt.

Detection of Locally Activated Location Attempts

A software application local to the mobile device may request unauthorized positioning. Two examples of possible infiltration include use of the SIM-toolkit or software "apps" running under the control of the mobile-devices operating system.

SIM Toolkit

Since 1996 the SIM (subscriber identity module) Toolkit (STK) has provided a method for retention of small software applications and data on the SIM. These SIM-based applications can interact with the subsystems of the mobile device via the SIM toolkit APIs. Almost every SIM (U-SIM, R-SIM) comes equipped with the STK making it the most spread application platform for mobile phones/equipment. Implantation of a rogue SIM-based application could be used to generate location estimates periodically or in response to an external event. Detection of the SIM-based rogue application will be by analysis of the STK API, the activation of the location subsystem or attempted transmission of the location data. Thus, in an exemplary embodiment where the LS is implemented as a client application, the LS can encapsulate the STK API. In an exemplary embodiment where the LS is implemented as part of a HVE, the LS can be configured to receive requests from the SIM card and analyze them. Similarly, in an exemplary embodiment where the LS is implemented as part of a secured mobile operating system, the LS can receive requests from the SIM card and analyze them.

Mobile Malware

With the wide acceptance of smart-phones, phones with general purpose operating systems, means that the whole menagerie of malware; including viruses, Trojans, and rootkits are available to induce unauthorized location attempts.

Detection of the malware application attempting to induce an unauthorized location attempt can be accomplished by analyzing the location API(s), the activation of the location subsystem, or attempted transmission of the location data, for messages that indicate that a malware application is attempting to access these subsystems.

Technology Specific Location Attempt Recognition

Mobile-Based, Mobile Assisted

For many of the mobile-based or mobile-assisted wireless location techniques, a control channel or control-plane implementation has been standardized. User plane implementations of each of the following techniques are possible so the location sentry application, as designed, can recognize either implementation.

GNSS Positioning

In GNSS Positioning, the mobile must be or become active, a location must be requested and satellite signals must be collected at the mobile device. Location computation may be local or at a land-side processor with the mobile transmitting the location or collected satellite signal data.

Triggers for recognition of a GNSS positioning attempt include an event indicating a possible state change, an event indicting a location request was received, an event indicating that a GNSS receiver was activated, an event indicating that a location was computed, or an event indicating that location coordinates or collected satellite data was placed in the outbound transmission queue.

AGNSS Positioning

In AGNSS Positioning, the mobile must be or become active, assistance data must be provided, a location must be requested and satellite signals must be collected at the mobile device. Location computation may be local or at a land-side processor with the mobile transmitting the location or collected satellite signal data.

Triggers for recognition of a GNSS positioning event include an event indicating a possible state change, an event indicating receipt of assistance data, an event indicating that a location request was received, an event indicating that the GNSS receiver was activated, an event indicating that location coordinates were computed, and/or an event indicating that location coordinates or collected satellite data was placed in the outbound transmission queue.

SUPL Positioning

In SUPL Positioning the user plane is used, assistance data must be provided, a location must be requested and satellite signals must be collected at the mobile device. Location computation may be local or at a land-side processor with the mobile transmitting the location or collected satellite signal data.

Triggers for recognition of a GNSS positioning event include an event indicating the receipt of assistance data, an event indicating that a location request was received, an event indicating that the GNSS receiver was activated, an event indicating that location coordinates were calculated, and/or an event indicating that location coordinates or collected satellite data was placed the outbound transmission queue.

OTDOA Positioning

With OTDOA positioning, beacon timing information is collected from the broadcasts of the wireless communications network and either the control plane or user plane may be used. Location computation may be local or at a land-side processor with the mobile transmitting the location or collected beacon data.

Triggers for recognition of a OTDOA positioning event include an event indicating that assistance data was received, an event indicating that a location request was received, an event indicating that a specialized receiver scanning mode was activated, an event indicating that coordinates were computed, and/or an event indicating that coordinates or collected location data was placed in the outbound transmission queue.

AFLT Positioning

With OTDOA positioning, beacon timing information is collected from the broadcasts of the wireless communications network and either the control plane or user plane may be used. Location computation may be local or at a land-side processor with the mobile transmitting the location or collected beacon data.

Triggers for recognition of a AFLT positioning event include an event indicating that assistance data was received, an event indicating that a location request was received, an event indicating that a specialized receiver scanning procedure was activated, an event indicating ordered changes in the collection of beacon timing, an event indicating that the location was computed, or an event indicating that coordinate or collected location-related data was placed in the outbound transmission queue.

EOTD Positioning

With EOTD positioning, beacon timing information is collected from the broadcasts of the wireless communications network and either the control plane or user plane may be used. Location computation may be local or at a land-side processor with the mobile transmitting the location or collected beacon data.

Triggers for recognition of a EOTD positioning event include an event indicating that the assistance data was received, an event indicating that a location request was received, an event indicating that a specialized receiver scanning mode was activated, an event indicating that coordinates were computed, and/or an event indicating that coordinates or collected location data was placed in the outbound transmission queue.

ECID Positioning

With ECID positioning, serving cell beacon timing information and power measurements from nearby cell sites is collected from the broadcasts of the wireless communications network. Location computation may be local or at a land-side processor with the mobile transmitting the location or collected beacon data.

Triggers for recognition of a ECID positioning event include an event indicating that a location request was received, timing changes in the reporting of beacons, an event indicating that a specialized receiver scanning mode was activated, an event indicating that coordinates were computed, and/or an event indicating that coordinates or collected location data was placed in the outbound transmission queue.

RF Fingerprinting Positioning

With RF Fingerprinting positioning, also known as wireless signatures, power measurements from nearby cell sites are collected from the broadcasts of the wireless communications network. This power information can be combined with the serving cell identification and timing range (e.g. Timing Advance, Round-Trip-Time, or Serving-One-Way-Delay) from the serving cell as a hybrid location. Location computation may be local or at a land-side processor with the mobile transmitting the location or collected beacon data. Regardless of mobile-based or network-assisted location computation, the power measurements must be compared to the recorded or modeled measurements from the calibration database to find the best match and thus the most probable location.

Triggers for recognition of an RF Fingerprinting positioning event include an event indicating that a location request was received, timing changes in the reporting of beacons, an event indicating that a specialized receiver scanning mode was activated, an event indicating that coordinates were locally computed, and/or an event indicating that coordinates or collected location data was placed in the outbound transmission queue.

Alternative Embodiments

Location Spoofing

Once a fraudulent or simply unwanted location attempt has been detected, prevention or spoofing of a mobile device's location may be desired. For example, the location sentry can remove the location information from the outgoing message queue and/or spoof the location or location-related measurement information. Spoofing of location includes:

Local Interception and Replacement

The location sentry can, with its emplacement into the exit queue for the mobile device's transmitter, replace a location estimate with coordinates for a default location, a previous location, or a current dithered (lower accuracy) location.

Local Spoofing of Received Satellite Information

The location sentry can, with its emplacement into the exit queue for the mobile transmitter, replace location related signal measurements (such as GPS pseudo-ranges) with degraded measurements.

Local Spoofing of Received Network Information

The location sentry can, with its emplacement into the exit queue for the mobile transmitter, replace received network based information, such as the serving cell identifier or the identifiers and received power levels from neighboring cells with minimal disruptions. A specific example of a spoofing technique in a spread spectrum system could be configuring the mobile device to randomly select from any of the active set cells to report a cell-ID location. Another specific example of a spoofing method could be to report a subset of detected neighboring beacons. For instance, if the mobile only reports a single serving and a single neighboring cell, ECID, OTDOA, and AFLT techniques are negated while the communications and mobility are not affected.

Falsification of Mobile Location Capabilities

When an unauthorized location attempt is detected, the location sentry can, with its emplacement into the exit queue for the mobile transmitter, block outgoing location-related messaging and instead respond to the location request with a location-type-not-supported message, concealing the true location capabilities of the mobile device.

FIG. 8

Figure 8:
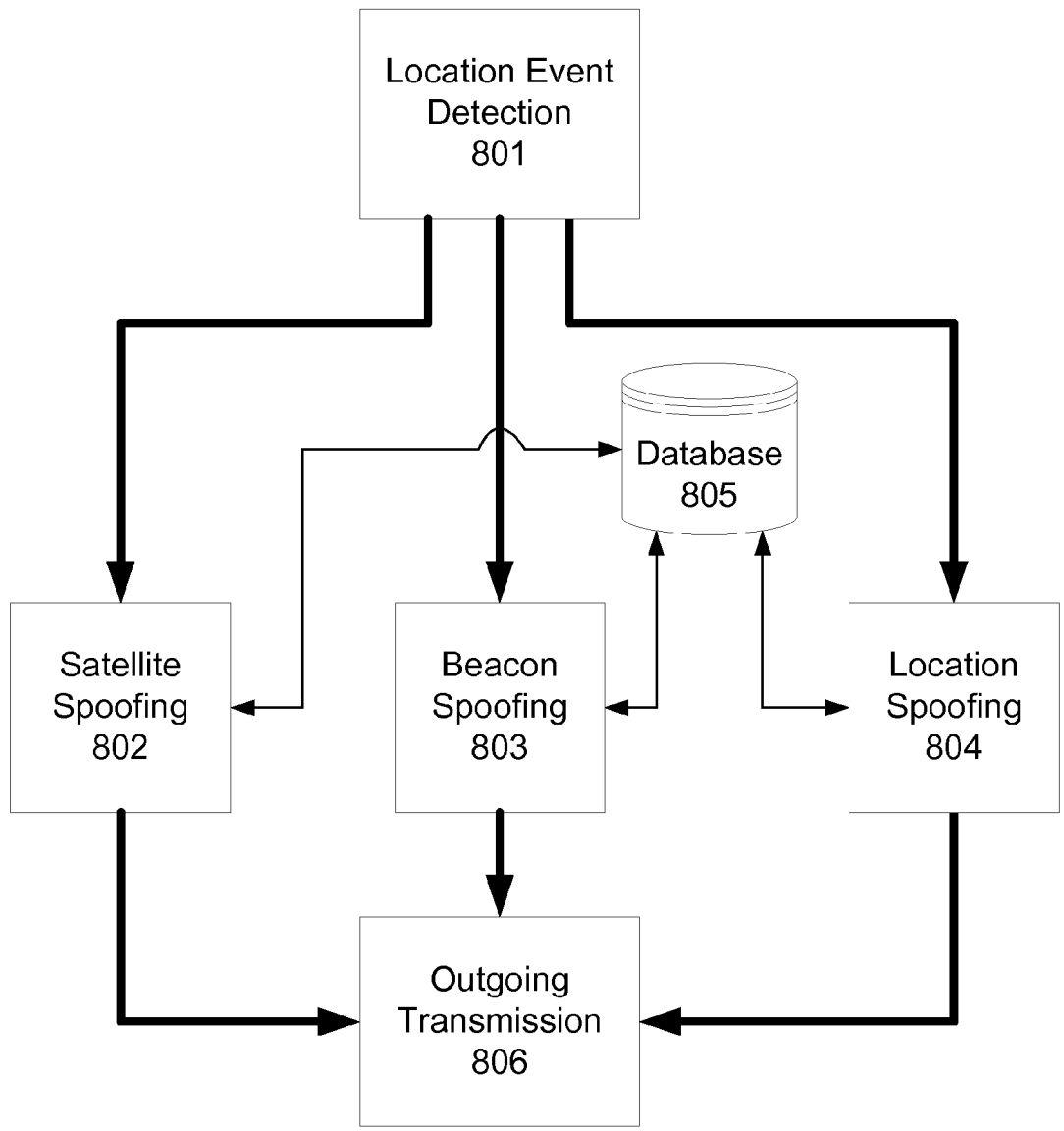
FIG. 8 shows a high-level depiction of the spoofing capabilities of the location sentry.

FIG. 8 graphically depicts the procedure for implementing of a spoofing scheme. The mobile device based location sentry detects an unauthorized location event 801. Based on user preferences and/or mobile device capabilities as stored in the database 805, location spoofing 804 may be used to report incorrect, inaccurate or a previously recorded (in the database 805) location. Location spoofing 804 may also be used to report the mobile device capabilities as not supporting the requested location technique.

If the mobile device is equipped with a GNSS receiver and GNSS positioning is requested, satellite spoofing 802 may be used to report inadequate satellite coverage, degraded satellite broadcast measurements, substituted satellite broadcast measurements, or preset/recorded prior satellite broadcast measurements.

If a unauthorized beacon-based location or beacon measurement request is received, beacon spoofing 803 may be used. A subset of the actual detected beacons or degraded beacon signal strengths would be used to generate an inaccurate location or delivered for landside processing.

For each spoofing method, the altered messaging or location would be send over the radio air interface as an outgoing transmission 806.

One example of location spoofing would be a privileged mobile device where the user is never tracked. In this case, every mobile location attempt and every network measurement would be distorted or degraded to prevent precise location.

CONCLUSION

The true scope the present invention is not limited to the presently preferred embodiments disclosed herein. Insofar as the block diagrams and/or examples described above contain one or more functions and/or operations, it will be understood by those within the art that each function and/or operation within such block diagrams, or examples can be implemented, individually and/or collectively, by a wide range of hardware, software, firmware, or virtually any combination thereof. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the scope of the subject matter described herein. Accordingly, except as they may be expressly so limited, the scope of protection of the following claims is not intended to be limited to the specific embodiments described above.

What is claimed:

1. A mobile device operable to communicate with a wireless network and configured to detect unauthorized location attempts, comprising:
    a processor; and
    a memory coupled to the processor, the memory including instructions that upon execution cause the processor to execute an operational procedure, the memory comprising:
        instructions for identifying a sequence of events that includes an event indicating that a location subsystem of the mobile device was activated;
        instructions for determining that the sequence of events is indicative of an unauthorized attempt to locate the mobile device, wherein the instructions for determining that the sequence of events is indicative of an unauthorized attempt to locate the mobile device comprise instructions for determining that the sequence of events includes an event indicating that a global positioning system receiver of the mobile device was activated, and an event indicating that data used to assist in a location calculation was received from a wireless network; and
        instructions for responding to a location request by sending a default location or a spoofed location to the wireless network, including: instructions for sending location information for a default location to the wireless network; instructions for sending location information for a previous location to the wireless network; instructions for sending inaccurate satellite measurement information to the wireless network; instructions for sending inaccurate location-related signal measurement data to the wireless network; instructions for sending a cell-ID identifier randomly selected from a group of active set cells to the wireless network; and instructions for sending identifiers for a subset of detected beacon signals to the wireless network.

2. The mobile device of claim 1, wherein the instructions for determining that the sequence of events is indicative of an unauthorized attempt to locate the mobile device further comprise:
    instructions for determining that the sequence of events includes an event indicating that location information was placed in an outgoing message queue.

3. The mobile device of claim 1, wherein the instructions for determining that the sequence of events is indicative of an unauthorized attempt to locate the mobile device further comprise:
    instructions for determining that the sequence of events includes an event indicating that the mobile device entered into a scanning mode for receiving beacon timing information from a plurality of base stations.

4. The mobile device of claim 1, wherein the instructions for determining that the sequence of events is indicative of an unauthorized attempt to locate the mobile device further comprise:
    instructions for determining that the sequence of events includes an event indicating that a request for location information was received from the wireless network.

5. The mobile device of claim 1, wherein the instructions for determining that the sequence of events is indicative of an unauthorized attempt to locate the mobile device further comprise:
    instructions for determining that the sequence of events includes an event indicating that a program executing on the mobile device requested to access the location subsystem; and
    instructions for determining that the program is not authorized to access the location subsystem.

6. The mobile device of claim 5, wherein the program is a program stored on a SIM card.

7. The mobile device of claim 1, wherein the instructions for determining that the sequence of events is indicative of an unauthorized attempt to locate the mobile device further comprise:
    instructions for determining that the sequence of events includes an event indicating that the mobile device transitioned from an idle mode to an active mode.

8. The mobile device of claim 1, wherein the memory further comprises:
    instructions for displaying an alert indicating that an unauthorized attempt to locate the mobile device was identified.

9. The mobile device of claim 1, wherein the memory further comprises:

instructions for sending an error message to the wireless network indicating that the mobile device cannot support a location attempt.

10. The mobile device of claim 1, wherein the memory further comprises:
instructions for sending a message to the wireless network that indicates that the mobile device does not include a location subsystem.

11. The mobile device of claim 1, wherein the memory further comprises:
instructions for sending information to the wireless network indicating that satellite coverage is inadequate to receive satellite signals.

12. The mobile device of claim 1, wherein the memory further comprises:
instructions for a receiver-location sentry client application that encapsulates an application program interface for a wireless receiver, wherein the receiver-location sentry client application is configured to analyze incoming messages received by the wireless receiver;
instructions for a transmitter-location sentry client application that encapsulates an application program interface for a wireless transmitter, wherein the transmitter-location sentry client application is configured to analyze messages placed into an outgoing queue for transmission to the wireless network; and
instructions for a location-subsystem-location sentry client application that encapsulates an application program interface for the location subsystem, wherein the location-subsystem-location sentry client application is configured to analyze messages sent to the location subsystem.

13. The mobile device of claim 1, wherein the memory further comprises:
instructions for running an operating system for the mobile device within a virtualization environment, wherein the virtualization environment is configured to monitor messages received by the wireless receiver, messages placed into an outgoing queue for transmission to the wireless network, and messages sent to the location subsystem for messages indicative of attempts to locate the mobile device.

14. The mobile device of claim 1, wherein the memory further comprises:
instructions for a wireless receiver application program interface, wherein the wireless receiver application program interface is configured to monitor incoming messages for messages that include location requests and/or messages that include data used to assist in a location calculation;
instructions for a wireless transmitter application program interface, wherein the wireless transmitter application program interface is configured to monitor outgoing messages for messages that include location information; and
instructions for a location subsystem application program interface, wherein the location subsystem application program interface is configured to monitor messages sent to the location subsystem for unauthorized attempts to activate the location subsystem.

15. A non-transitory computer-readable storage medium including a location sentry system for use in a mobile device, the computer-readable storage medium comprising:
instructions for logging a group of events in a database of the mobile device;
instructions for detecting, in the group of events, an event indicating that location information was placed in an outgoing message queue for transmission to a base station;
instructions for determining that the group of events is indicative of an unauthorized attempt to locate the mobile device;
instructions for logging the group of events as an attempt to locate the mobile device; and
instructions for transmitting a default location or a spoofed location, including: instructions for transmitting location information for a default location; instructions for transmitting location information for a previous location; instructions for transmitting inaccurate satellite measurement information; instructions for transmitting inaccurate location-related signal measurement data; instructions for transmitting a cell-ID identifier randomly selected from a group of active set cells; and instructions for transmitting identifiers for a subset of detected beacon signals;
wherein the instructions for determining that the group of events is indicative of an unauthorized attempt to locate the mobile device further comprise at least one of: (a) instructions for determining that an event is present within the group of events that indicates that a location subsystem was accessed; (b) instructions for determining that an event is present within the group of events that indicates that a global positioning system receiver of the mobile device was activated; (c) instructions for determining that an event is present within the group of events that indicates that the mobile device entered into a scanning mode for receiving beacon timing information from a plurality of base stations; and (d) instructions for determining that an event is present within the group of events that indicates that data used to assist in a location calculation was received by the mobile device.

16. The computer-readable storage medium of claim 15, wherein the instructions for determining that the group of events is indicative of an unauthorized attempt to locate the mobile device further comprise:
instructions for determining that an event is present within the group of events that indicates that a location subsystem was accessed.

17. The computer-readable storage medium of claim 15, wherein the instructions for determining that the group of events is indicative of an unauthorized attempt to locate the mobile device further comprise:
instructions for determining that an event is present within the group of events that indicates that the mobile device entered into a scanning mode for receiving beacon timing information from a plurality of base stations.

18. The computer-readable storage medium of claim 15, wherein the instructions for determining that the group of events is indicative of an unauthorized attempt to locate the mobile device further comprise:
instructions for determining that an event is present within the group of events that indicates that a request for location information was received.

19. The computer-readable storage medium of claim 15, wherein the instructions for determining that the group of events is indicative of an unauthorized attempt to locate the mobile device further comprise:
instructions for determining that an event is present within the group of events that indicates that an unauthorized program executing on the mobile device attempted to access the location subsystem.

20. The computer-readable storage medium of claim 15, wherein the instructions for determining that the group of events is indicative of an unauthorized attempt to locate the mobile device further comprise:
instructions for determining that an event is present within the group of events that indicates that data used to assist in a location calculation was received from a wireless network.

21. The computer-readable storage medium of claim 15, wherein the instructions for determining that the group of events is indicative of an unauthorized attempt to locate the mobile device further comprise:
instructions for determining that an event is present within the group of events that indicates that the mobile device transitioned from an idle mode to an active mode.

22. The computer-readable storage medium of claim 15, further comprising:
instructions for displaying an alert indicating that an attempt to locate the mobile device was detected.

23. The computer-readable storage medium of claim 15, further comprising: instructions for removing the location information from the outgoing message queue.

24. The computer-readable storage medium of claim 15, further comprising:
instructions for sending an error message to the network responsive to the determination that the group of events is indicative of an unauthorized attempt to locate the mobile device.

25. The computer-readable storage medium of claim 15, further comprising:
instructions for sending a message to the network that indicates that the mobile device does not include a location subsystem in response to the determination that the group of events is indicative of an unauthorized attempt to locate the mobile device.

26. The computer-readable storage medium of claim 15, further comprising:
instructions for sending information that indicates inadequate satellite coverage to a wireless network in response to the determination that the group of events is indicative of an unauthorized attempt to locate the mobile device.

27. The computer-readable storage medium of claim 15, further comprising:
instructions for a receiver-module that encapsulates an application program interface for a wireless receiver, wherein the receiver-module is configured to analyze incoming messages for requests for location information and/or data used to assist in a location calculation;
instructions for a transmitter-module that encapsulates an application program interface for a wireless transmitter, wherein the transmitter-module is configured to analyze messages placed into an outgoing queue for unauthorized attempts to transmit location information; and
instructions for a location-subsystem-module that encapsulates an application program interface for the location subsystem, wherein the location-subsystem-module is configured to analyze messages for unauthorized attempts to access the location subsystem.

28. The computer-readable storage medium of claim 15, further comprising:
instructions for running an operating system for the mobile device within a virtualization environment, wherein the virtualization environment is configured to analyze messages received by the wireless receiver, messages placed into an outgoing queue for transmission to a wireless network, and messages sent to location the subsystem for messages indicative of unauthorized attempts to locate the mobile device.

29. The computer-readable storage medium of claim 15, further comprising:
instructions for a wireless receiver application program interface, wherein the wireless receiver application program interface is configured to monitor incoming messages for messages that include location requests and/or messages that include data used to assist in a location calculation;
instructions for a wireless transmitter application program interface, wherein the wireless transmitter application program interface is configured to monitor outgoing messages for unauthorized attempts to transmit location information; and
instructions for a location subsystem application program interface, wherein the location subsystem application program interface is configured to monitor for unauthorized attempts to activate the location subsystem.

* * * * *